July 14, 1931.  J. V. WIGLE  1,814,535
BRAKE MECHANISM
Filed March 1, 1929  2 Sheets-Sheet 1

Inventor
Joy V. Wigle
By Walter W. Burns
Attorney

July 14, 1931. J. V. WIGLE 1,814,535
BRAKE MECHANISM
Filed March 1, 1929   2 Sheets-Sheet 2
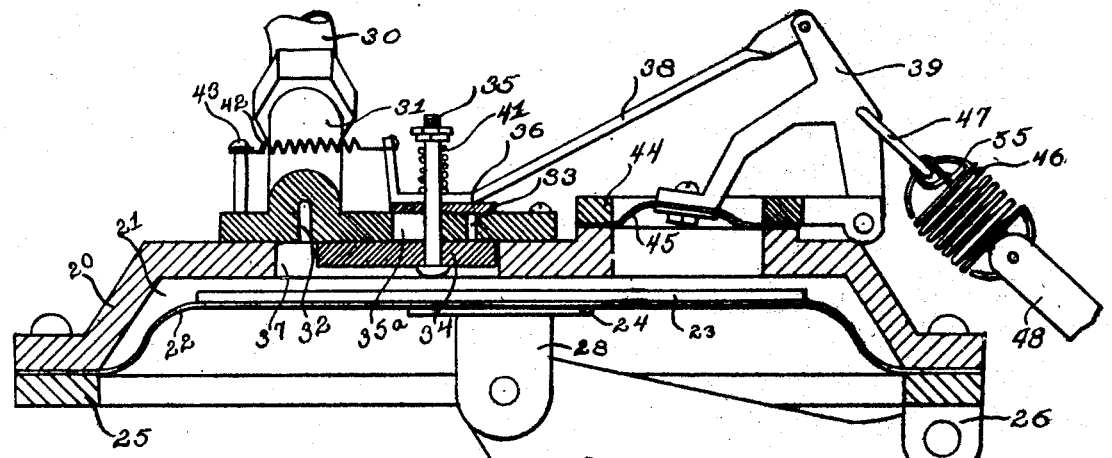
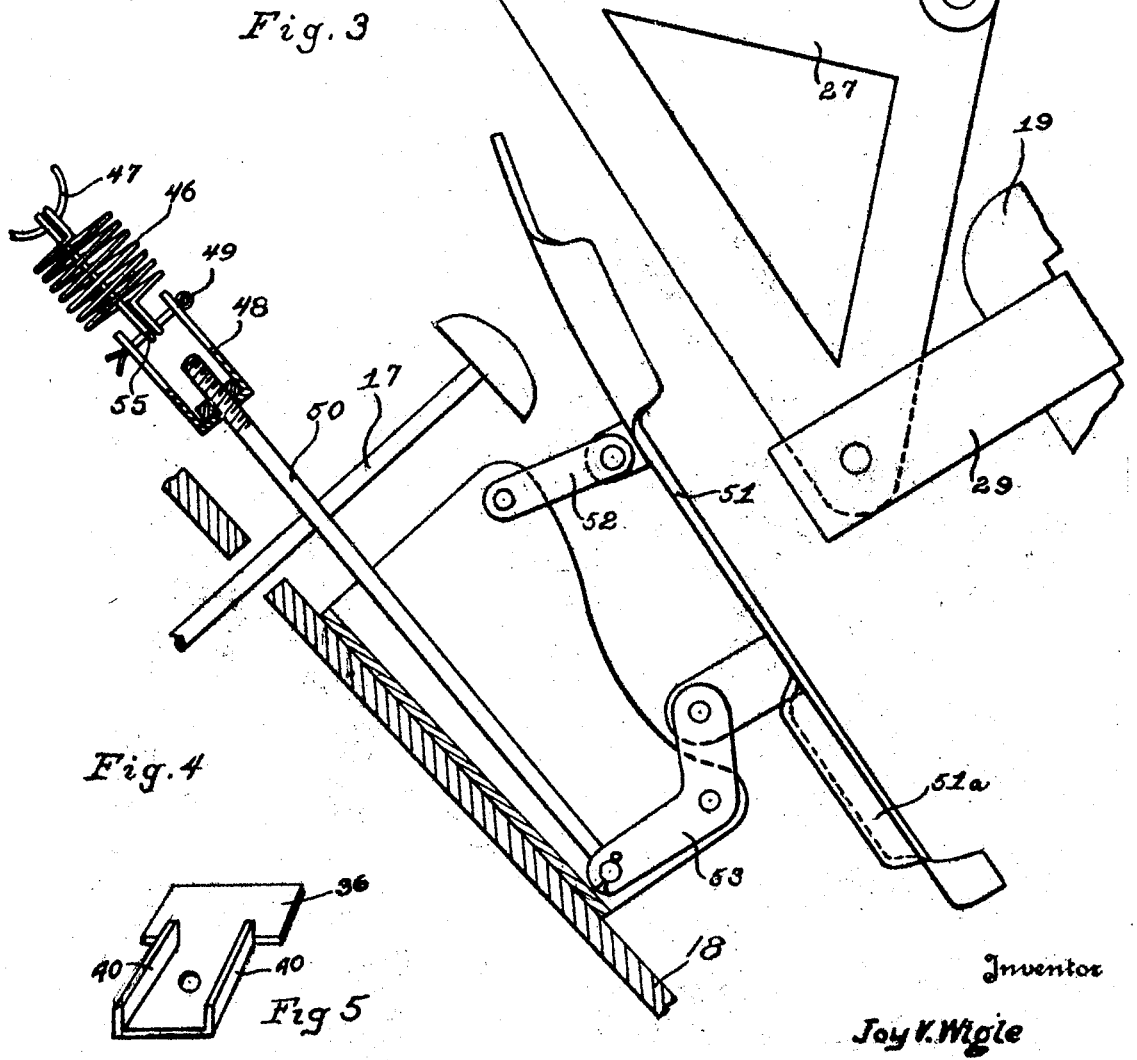
Inventor
Joy V. Wigle
By Walter W. Burns
Attorney Patented July 14, 1931

1,814,535

UNITED STATES PATENT OFFICE

JOY V. WIGLE, OF CHATTANOOGA, TENNESSEE, ASSIGNOR TO AMERICAN AUTOMOBILE APPLIANCE COMPANY, OF CHATTANOOGA, TENNESSEE, A CORPORATION OF DELAWARE

BRAKE MECHANISM

Application filed March 1, 1929. Serial No. 343,666.

This invention relates to brake operating means and particularly to those brake operating means intended especially for operation from the partial vacuum created in the manifold of an internal combustion engine.

In brakes used on vehicles, there is usually a comparatively large amount of slack in the operating parts in proportion to the movement required to give the full braking effort after the initial braking effort has begun. In other words, the brake operating parts during a large part of the initial movement simply move to the point where the initial braking effort begins, after which a very small further movement places the brakes in full operation.

There are two general ways which may be utilized in placing fluid controlled brakes in operative position: first, by controlling the position of the brake operating rod or member and second, by controlling the pressure on the brake operating rod or member, regardless of its position.

In the case of the control by position it will be readily seen that the greater portion of the brake control will take place during the latter part of the movement where a small movement of the brake operating rod or member will mean a great change in the braking effort. These positions for different adjustments will consequently be close together. The result is that a manual control which is operated by the foot or hand may, due to the movement of the vehicle, cause a greater or lesser braking effort than is intended.

In the second method where the braking effort is controlled by the control of the pressure, regardless of the position of the brake operating rod or member, a greater range of control is possible because of the fact, as will later appear, that the initial great nonactive movement may be taken up by a small movement of the control member, leaving the remainder of the movement of the control member to variably control the fluid pressure during the small movement left between the positions occupied by the brake operating rod or member between initial and full braking positions. Because of the relative ranges of movement in the control of fluid brakes, this invention deals only with the second method wherein the pressure in the brake operating member is controlled.

The primary object of this invention is the provision of an improved brake operating device wherein is provided a control member whose positions control pressures on the brake operating rod or member.

Another and further object of this invention is the provision of a fluid brake operating device wherein the control of the fluid is brought about by the differential between the pressure in the fluid chamber and the pressure exerted by the manual control.

Another and further object of this invention is the provision in a fluid brake operating device of a means for resiliently exerting pressures on a motor-means to control a valve which admits or permits to leave or stops admitting or permitting to leave, the fluid medium from the main motor means and at the point or points appropriate to the pressure desired in the brake operating rod or member.

Still another object of this invention is the provision of a fluid brake operating means, operated from the exhaust action of the intake manifold of an internal combustion engine and which has a manually operated control means having a resilient connection to a fluid controlled device for controlling a valve for in turn controlling the pressure in the main motor means.

A still further object of this invention is the provision, in a fluid brake operating means, of a foot pedal control being bodily rockable about two centers to give the toe portion a grater control for a given movement near one of its limits of movement and the heel a greater control for a given movement adjacent the opposite limit of movement.

Another and still further object of my invention is the provision of a combination of an internal combustion engine with a fluid tension chamber having a diaphragm for a movable wall and a valve controlled duct from the diaphragm chamber and connected to the intake connection of the engine between the throttle valve and the engine cylinder.

Other and further objects of this invention will be apparent to those skilled in the art from a reading of the complete specification and claims.

Referring to the drawings wherein there is illustrated an embodiment of the invention, Figure 1 is a top view of the invention.

Figure 3 is an enlarged view of the power portion of the device similar to Figure 2, but showing the parts in positions assumed when the device is operated to apply the brakes.

Figure 4 is a view of the manually operated control device in position to bring about the operation shown in Figure 3.

Figure 5 is a detached perspective view of the valve 36.

Similar reference characters refer to the same or similar parts throughout the several views of the drawings.

Figure 1:
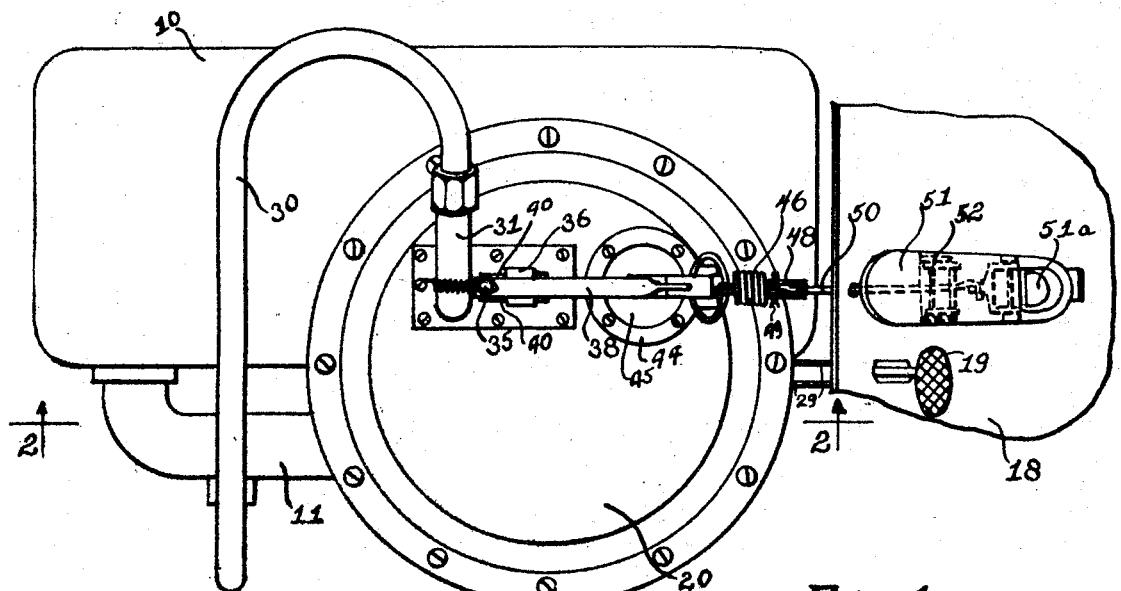

I will now describe this invention in connection with a conventional showing of an automobile.

In the drawings, 10 designates the motor having an intake manifold 11, a carburetor 12, the butterfly throttle valve 13 being located in the upper part of the carburetor. The butterfly throttle valve is operated by a crank 14 which is moved by a rod 15.

The rod 15 is connected to one end of a lever 16 which is connected at its opposite end to an accelerator rod and button 17 which passes through the floor 18 of an automobile. Extending through the floor 18 is the usual brake lever 19 for operation of the service brakes. All of the aforementioned construction is common to most automobiles and since per se it forms no part of the present invention, no further detailed description will be given.

To provide power for the brake operating mechanism, there is a fluid pressure chamber having a movable wall. The tension to be used is to be derived from the tendency toward vacuum created in the intake system, and as this tension has to be conserved, there is provided the shell 20 having a chamber 21 with the movable wall 22 in the form of a diaphragm. To stabilize the diaphragm 22, it is placed between the large upper plate 23 and the small lower plate 24. A ring 25 secures the edge of the diaphragm in place and is provided with a fulcrum 26 for the bell crank lever 27. The power end of the lever 27 is pivotally connected to the plate 24, at 28, its other end being connected to the strap link 29 which in turn has an operative connection to the brake lever 19 already described. The strap link 29 is so constructed as to permit free use of the brake lever 19 without moving any of the power device which forms a part of this invention. An advantage of using the type of power unit which involves the diaphragm is that there is no loss by leakage past pistons and no loss by friction between sliding surfaces.

The intake connection has a duct leading therefrom in the form of a pipe 30 which is connected at its other end to a casting 31 on the upper side of the wall of the casting 20. Beneath this casting 31 is a cut-away place to provide communication to the chamber 21. The casting 31 is provided at its inner side with a valve port 32. In communication between the atmosphere and the chamber 21 is a valve port 33. A valve 34 is provided against the inner face of the casting 31 and is of sufficient length to close both the port 32 and the valve port 33 at the same time. It has sufficient travel in each direction to open either port 32 or port 33 keeping the other closed. To operate this valve 34 is a pin or bolt 35 which passes through the casting 31. Connected to the pin or bolt 35 on the upper surface of the casting 31 is a valve 36 which has an edge opposite the edge of the valve 34 which opens and closes the port 33. It will be noted that the casting 31 is provided with a slot 35ª (see Fig. 3) to guide the pin or bolt 35 and to provide for its movement. The valve 34 is placed to lightly engage one side 37 of the cut-away opening already referred to. This side 37 guides the valve 34 so that it always properly registers with the ports 32 and 33.

To move the valves 34 and 36, there is provided an operating rod 38 which is connected to a bell crank lever 39. The valve 36 is provided with small wings 40 which are folded up to permit the rod 38 to fit snugly, but not tightly, thus holding the valve 36 in its proper relation.

A spring 41 surrounds the pin or bolt 35 and holds the parts 34, 31, 36 and 38 together, but permitting of sliding motion between the valves 34, 36 and the casting 31. A spring 42 connected between the screw upright 33 and the upturned end of the rod 38 normally tends to hold the valve port 32 closed and the port 33 open.

The bell crank lever 39 is pivoted at its fulcrum to the ring 44. The fluid motor means, which is provided to operate the bell crank lever 39 and the valves 34 and 36, is in the form of a diaphragm 45. This diaphragm 45 possesses the advantages of the diaphragm 22 already pointed out. This diaphragm 45 is held in place between the ring 44 and the face of an opening in the casing 20 and is exposed to the atmospheric pressure on its outside and the tension of the chamber 21 on the inside.

One end of the bell crank lever 39 is bolted to the center of the diaphragm 45, the latter having a tendency to move this bell crank lever 39 when the tension within the chamber 21 is taken from the partially evacuated intake as illustrated. This tends to close the valve port 32 and open the port 33.

The bell crank 39 has connected to it, a spring 46 which is carried by the ring 47.

This spring 46 is connected at its opposite end to a yoke 48 by the cotter pin 49. An adjustable connection with the rod 50 is provided for varying the connection length to the manually operated control.

The manually operated control comprises a foot pedal 51 having two separate pivot supports—on the forward end by the links 52 and on the rear end by the bell crank lever 53.

Figure 2:
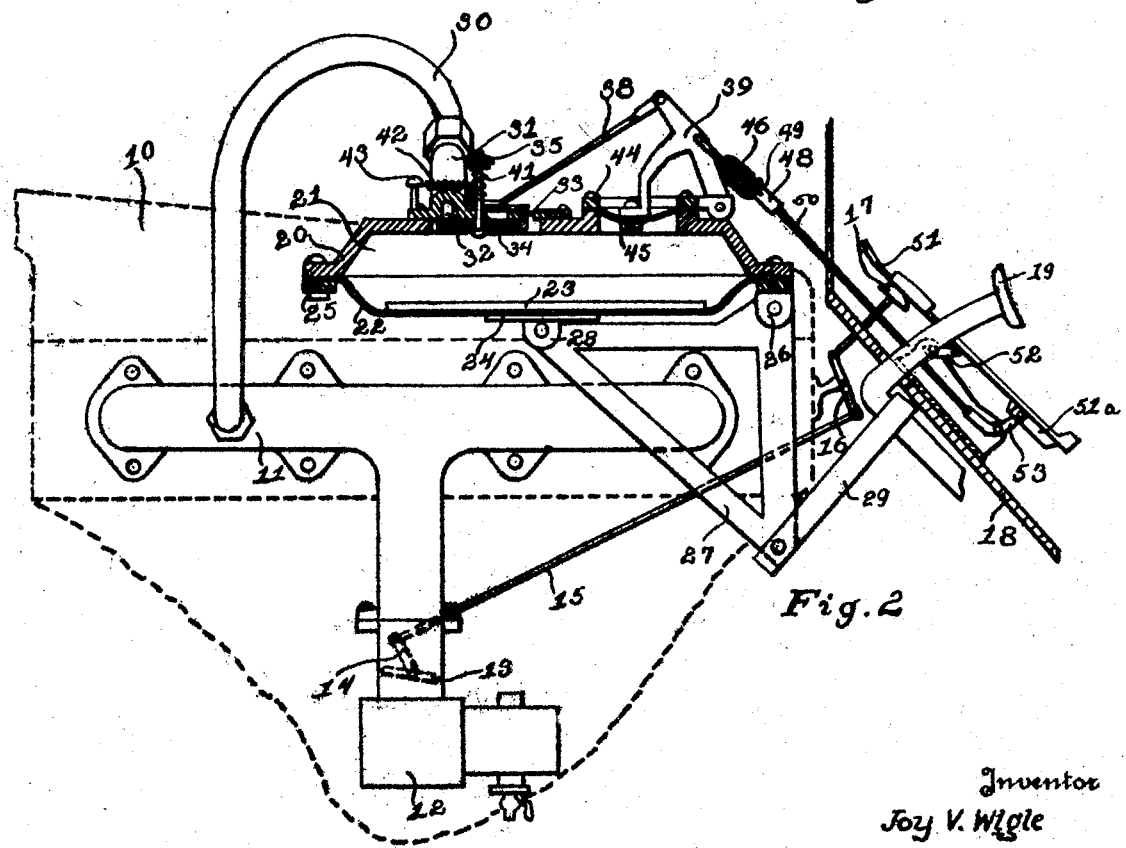
Figure 2 is a cross section on the line 2—2 of Figure 1 showing the parts in non-operative positions.

The lower end of the bell crank lever 53 is connected to the rod 50 for controlling the valves 34, 36, already described. The foot pedal is so placed as to operate the accelerator 17 when moved to a forward position and to execute a pull in the rod when the foot presses the pedal in a rearward direction. It will be observed that when the pedal 51 is operated in a forward direction to operate the accelerator 17 as illustrated in Figure 2, the pedal 51 moves about a center in the axis of the upper end of the bell crank lever 53. When, however, the brake is operated, the pedal moves about a fulcrum in the upper end of the links 52. (See Figure 4). This, it will be observed, gives greater leverage to each operation than could be obtained by a single pivot for the pedal 51, wherever the pivot might be placed.

As shown on Figure 4, a limiting link 55 is provided between the ring 47 and the cotter key 49. When the spring 46 is stretched to the point where the link 55 takes the pull between the ring 47 and the cotter key 49, the resilient feature is lost and a direct connection is established between the pedal 51 and the valve 34.

In operation, the accelerator would be first released by a backward rocking movement of the pedal 51. This closes the throttle valve 13 by the action of suitable spring, a part of all automobiles and not shown herein. Further backward movement of the pedal exerts a pull through the rod 50, spring 46, bell crank lever 39, rod 38, pin or bolt 35 and the valves 34 and 36. These latter move to first close the atmospheric port 33.

Further movement of the valve 34 opens the port 32. The air at atmospheric pressure now is drawn out through the port 32 to the engine intake pipe.

This tendency to create a vacuum in the chamber 21 lifts the diaphragm 22 to the position in Figure 3 or to a position short of this position determined by the time the duct 32 is kept open. Supposing a weak tension of the spring 46, the withdrawal of the air from the chamber 21 will continue until the effect of the exhaust on the diaphragm 45 pulls downward to move the bell crank lever 39 against the action of the spring 46. When the bell crank lever 39 is moved to the left in Figure 3 sufficiently to close the valve 34 over the port 32, the action will be arrested. A balance will now exist between the spring 46 pulling one way and the tension of the air on the diaphragm 45 and the spring 42 in the opposite direction.

It is to be here observed that the action of the diaphragm 22 in its initial movement was free until it exerted a pull on the hanger 29 and in turn on the brake lever 19. The parts then reached a balance and were stationary.

If it is desired to have the brakes put on to a greater degree, it is only necessary to press harder on the heel of the foot pedal and draw out the spring 46 to a greater degree. The same operation is repeated with the result that the brake lever 19 is pulled down further. If the maximum pull on the brake is desired, the heel of the pedal 51 is pushed all the way down.

This brings into action the link 55 and destroys the action of the spring 46, holding the valve 34 away from the port 32.

If now it is desired to release the brake without entirely taking it off, it is only necessary to permit the foot pedal 51 to raise slightly. This opens the port 33 by uncovering the valves 34 and 36 therefrom. This admits some atmospheric air. When the tension decreases, the relative tensions on the diaphragm 45 will cause movement of the valves 34 and 36 to close the port 33. The parts are again in balance. If a complete release is desired, the pedal 51 is moved forward releasing the pull on the spring 46. This effects a full opening of the port 33 and a complete flushing of the chamber 21 with atmospheric air. It is to be noted that the ports 32 and 33 are never opened both at the same time. The above description makes it clear that the braking action is controlled in the present invention by pressure and that the position of the movable member of the chamber 21 has no relation to the pressure therein and that the range of operation of the control of the device extends through the latter portion of the movement of the brake where a great change in pressure brings about a relatively small movement of the brake lever 19. This control by pressure rather than by position, it is believed, is clearly seen as being advantageous.

This is for the reason that a very slight pedal movement opens the valve 34 after which the diaphragm 22 moves to a point where it may become effective, all of the remainder of the movement of the pedal being reserved for control of the pressure increments on the brake lever while the latter has very little movement. Moreover the close proximity of the valve 34 and its ports 32 and 33 to the tension chamber 21, gives that instantaneous action which is essential in an automobile brake and gives the operator the "feel" of his brakes as would be impossible if the ports and valve were located at the end of a duct at a distance from the chamber.

The pedal is provided with a socket to receive the heel of a lady's shoe to enable the foot to be held in the proper relation. This socket not only takes care of the forward and rearward relation, but tends to level the foot to facilitate operation. This socket or depression is designated by the numeral 51ª.

While there is shown and described in detail an embodiment of the invention, it is to be understood that the invention is not limited to the exact showing and that modifications and changes may be made without departing from the spirit of the invention and within the scope of the appended claims.

Having described my invention what I claim and desire to secure by Letters Patent is:—

1. A fluid operated brake mechanism, comprising a fluid tension chamber having a movable wall and a fixed wall provided with a port, means operated by the movable wall for operating the brake mechanism, a source of fluid tension, duct means for connecting the source of tension with the port, valve means for the port for controlling the tension within the chamber, fluid operated motor means in the fixed wall of the chamber for controlling the operation of the valve and exposed to the tension within the chamber and a manually operable means mechanically connected with the motor means for influencing the position of the valve.

2. A fluid operated brake mechanism comprising a fluid tension chamber having a fixed wall and a movable wall for operating the brake mechanism the fixed wall having a port, a source of fluid tension, duct means for connecting the source of tension with the port, valve means for the port for controlling the tension within the chamber, fluid-operated motor means including a second movable wall in the chamber for controlling the operation of the valve and exposed on one side to the tension within the chamber and on the other side to the atmosphere.

3. A fluid operated brake mechanism comprising a fluid tension chamber having a movable wall and a fixed wall provided with a part, means operated by the movable wall for operating the brake mechanism, a source of fluid tension, duct means for connecting the source of tension with the port, valve means for the port for controlling the tension within the chamber, fluid-operated motor means including a second movable wall in the chamber for controlling the operation of the valve and exposed on one side to the tension within the chamber and on the other side to the atmosphere and a manually operable means mechanically connected with the motor means for influencing the position of the valve.

4. A fluid operated brake mechanism comprising a fluid tension chamber having a movable wall and a fixed wall provided with a port, means operated by the movable wall for operating the brake mechanism, a source of fluid tension, duct means for connecting the source of tension with the port, valve means for the port for controlling the tension within the chamber, fluid-operated motor means including a second movable wall in the chamber for controlling the operation of the valve and exposed on one side to the tension within the chamber and on the other side to the atmosphere and a manually operable resilient means mechanically connected with the motor means for influencing the position of the valve.

5. A fluid operated brake mechanism comprising a fluid tension chamber having a movable wall and a fixed wall provided with a port, means operated by the movable wall for operating the brake mechanism, a source of fluid tension, duct means for connecting the source of tension with the port, valve means for the port for controlling the tension within the chamber, fluid-operated motor means including a second movable wall of the chamber for controlling the operation of the valve and exposed on one side directly to the tension within the chamber and on the other side to the atmosphere and a manually operable spring means mechanically connected with the motor means for influencing the position of the valve, the resilient means having a connection limiting the resilient action and affording a positive connection at the limit of the resilient action.

6. A fluid operated brake mechanism, comprising a fluid tension chamber having a movable wall and a fixed wall provided with a port, means operated by the movable wall for operating the brake mechanism, a source of fluid tension, duct means for connecting the source of tension with the port, valve means for the port for controlling the tension within the chamber, a fluid operated diaphragm, means in the fixed wall of the chamber connecting the diaphragm and valve for controlling the operation of the valve, the diaphragm being exposed to the tension within the chamber and a manually operable means mechanically connected with the motor means for influencing the position of the valve.

7. A fluid operated brake mechanism comprising a fluid tension chamber having a movable wall and a fixed wall provided with a port and connections for operating the brake mechanism, a source of fluid tension, duct means for connecting the source of tension with the port, valve means for the port for controlling the tension within the chamber, a fluid-operated diaphragm having a movable wall and connections for controlling the operation of the valve, the diaphragm being exposed on one side of the tension within the chamber and on the other side to the atmosphere.

8. A fluid operated brake mechanism comprising a fluid tension chamber having a movable wall and a fixed wall provided with a port, means operated by the movable wall for operating the brake mechanism, a source of fluid tension, duct means for connecting the source of tension with the port, valve means for the port for controlling the tension within the chamber, a fluid operated diaphragm having a movable wall for controlling the operation of the valve, the diaphragm being exposed on one side to the tension within the chamber and on the other side to the atmosphere and a manually operable means mechanically connected with the movable wall for influencing the position of the valve.

9. A fluid operated brake mechanism comprising a fluid tension chamber having a movable wall and a fixed wall provided with a port, means operated by the movable wall for operating the brake mechanism, a source of fluid tension, duct means for connecting the source of tension with the port, valve means for the port for controlling the tension within the chamber, a fluid-operated diaphragm having a movable wall and connections for controlling the operation of the valve, the diaphragm being exposed on one side to the tension within the chamber and on the other side to the atmosphere and a manually operable resilient means mechanically connected with the motor means for influencing the position of the valve.

10. A fluid operated brake mechanism comprising a fluid tension chamber having a movable wall and a fixed wall provided with a port, means operated by the movable wall for operating the brake mechanism, a source of fluid tension, duct means for connecting the source of tension with the port, valve means for the port for controlling the tension within the chamber, a fluid-operated diaphragm having a movable wall and connections for controlling the operation of the valve, the diaphragm being exposed on one side to the tension within the chamber and on the other side to the atmosphere and a manually operable spring means mechanically connected with the motor means for influencing the position of the valve, the resilient means having a connection limiting the resilient action and affording a positive connection at . . . . of the resilient action.

11. In combination, an internal combustion engine having a throttle controlled intake connection, a brake operating device, a vacuum chamber having a diaphragm wall therefor and a duct connection from the diaphragm chamber to the intake connection the wall of the chamber having valve ports for ingress and egress of pneumatic tension and connecting to the duct connection and atmosphere directly, respectively, and valve means to hold both ports closed simultaneously and so constructed that a small movement of the valve in one direction will open one port and a small movement in the opposite direction will open the other.

12. In combination, an internal combustion engine having a throttle controlled intake connection, a brake operating device, a vacuum chamber having a fixed wall provided with a port and a diaphragm wall, a duct connection from the diaphragm chamber to the intake connection, a valve for the port for controlling the duct and pneumatic connections for controlling the valve.

13. In combination, an internal combustion engine having a throttle controlled intake connection, a brake operating device, a vacuum chamber having a fixed wall provided with a port and a diaphragm wall, a duct connection from the diaphragm chamber to the intake connection, a valve for the port for controlling the duct and fluid tension controlled diaphragm means for operating the valve.

14. In combination, an internal combustion engine having a throttle controlled intake connection, a brake operating device, a vacuum chamber having a fixed wall provided with a port and a diaphragm wall, a duct connection from the diaphragm chamber to the intake connection, a valve for the port for controlling the duct and a diaphragm means for operating the valve, the diaphragm means having one side exposed to the pressure within the diaphragm chamber and the other side exposed to atmospheric pressure.

15. In combination, an internal combustion engine having a throttle controlled intake connection, a brake operating device, a vacuum chamber having a fixed wall provided with a port and a diaphragm wall, a duct connection from the diaphragm chamber to the intake connection, a valve for the port for controlling the duct, a fluid motor means for operating the valve, the fluid motor means having one side exposed to the pressure within the diaphragm chamber and the other side exposed to atmospheric pressure, a manually operated control and a resilient connection between the manually operated control and the fluid motor means.

16. In combination, an internal combustion engine having a throttle controlled intake connection, a brake operating device, a vacuum chamber having a fixed wall provided with a port and a diaphragm wall, a duct connection from the diaphragm chamber to the intake connection, a valve for the port for controlling the duct, a fluid motor means for operating the valve, the fluid motor means having one side exposed to the pressure within the diaphragm chamber and the other side exposed to atmospheric pressure, a manually operated control and a connection between the manually operated control and the fluid motor means, the connection having a resilient member acting during the first part of the movement of the manually operated control and a positively acting member acting during the latter part of its movement.

In testimony whereof I hereunto affix my signature.

JOY V. WIGLE.